United States Patent
Levy

(10) Patent No.: US 9,277,248 B1
(45) Date of Patent: Mar. 1, 2016

(54) SYSTEM, METHOD, AND COMPUTER PROGRAM FOR RECEIVING DEVICE INSTRUCTIONS FROM ONE USER TO BE OVERLAID ON AN IMAGE OR VIDEO OF THE DEVICE FOR ANOTHER USER

(75) Inventor: Nir Levy, Tel Aviv (IL)

(73) Assignee: Amdocs Software Systems Limited, Dublin (IE)

( * ) Notice: Subject to any disclaimer, the term of this patent is extended or adjusted under 35 U.S.C. 154(b) by 711 days.

(21) Appl. No.: 13/014,685

(22) Filed: Jan. 26, 2011

(51) Int. Cl.
*H04N 21/00* (2011.01)
*H04N 21/434* (2011.01)
*G06Q 30/00* (2012.01)
*H04L 29/08* (2006.01)

(52) U.S. Cl.
CPC ............. *H04N 21/00* (2013.01); *G06Q 30/00* (2013.01); *G06Q 30/01* (2013.01); *H04L 67/36* (2013.01); *H04N 21/434* (2013.01)

(58) Field of Classification Search
CPC .. H04L 12/2464; H04L 12/1813; G06F 15/16
USPC ............ 348/61; 709/203, 205; 715/508, 512, 715/738, 790, 764
See application file for complete search history.

(56) References Cited

U.S. PATENT DOCUMENTS

| 7,126,558 | B1 | 10/2006 | Dempski |
| 7,302,274 | B2* | 11/2007 | Makela et al. ................ 455/509 |
| 2005/0222889 | A1* | 10/2005 | Lai et al. ........................... 705/9 |
| 2005/0262201 | A1* | 11/2005 | Rudolph et al. ............. 709/205 |
| 2006/0101328 | A1* | 5/2006 | Albornoz et al. ............. 715/512 |
| 2007/0124685 | A1* | 5/2007 | Guillermo et al. ............ 715/740 |
| 2008/0071559 | A1 | 3/2008 | Arrasvuori |
| 2008/0313546 | A1* | 12/2008 | Nykamp ....................... 715/738 |
| 2009/0228778 | A1* | 9/2009 | Tannenbaum ................ 715/233 |
| 2011/0035662 | A1* | 2/2011 | King et al. ..................... 715/273 |
| 2012/0102118 | A1* | 4/2012 | Arms et al. .................... 709/205 |

* cited by examiner

Primary Examiner — Geepy Pe
Assistant Examiner — Joseph Becker
(74) *Attorney, Agent, or Firm* — Zilka-Kotab, PC

(57) ABSTRACT

A system, method, and computer program product are provided for receiving device instructions from one user to be overlaid on an image or video of the device for another user. In use, at least one of an image and video of a device is received from a first user via a network. Additionally, at least one instruction for the device is received from a second user, in response to the receipt of the at least one of the image and video of the device. Furthermore, the at least one instruction is provided to the first user for display as an overlay to the at least one of the image and video of the device.

25 Claims, 7 Drawing Sheets

SYSTEM, METHOD, AND COMPUTER PROGRAM FOR RECEIVING DEVICE INSTRUCTIONS FROM ONE USER TO BE OVERLAID ON AN IMAGE OR VIDEO OF THE DEVICE FOR ANOTHER USER

FIELD OF THE INVENTION

The present invention relates to instructions associated with a device, and more particularly to receiving instructions associated with a device.

BACKGROUND

Traditionally, when a user has desired to receive instructions for a device, namely for configuring and/or operating the device, the user has been required to review an instruction manual for the device or call customer service to speak with a customer service representative (CSR). Unfortunately, these methods for receiving instructions have been associated with various limitations. For example, both reviewing the manual and calling a CSR can be time consuming, inefficient, etc.

There is thus a need for addressing these and/or other issues associated with the prior art.

SUMMARY

A system, method, and computer program product are provided for receiving device instructions from one user to be overlaid on an image or video of the device for another user. In use, at least one of an image and video of a device is received from a first user via a network. Additionally, at least one instruction for the device is received from a second user, in response to the receipt of the at least one of the image and video of the device. Furthermore, the at least one instruction is provided to the first user for display as an overlay to the at least one of the image and video of the device.

DETAILED DESCRIPTION

Figure 1:
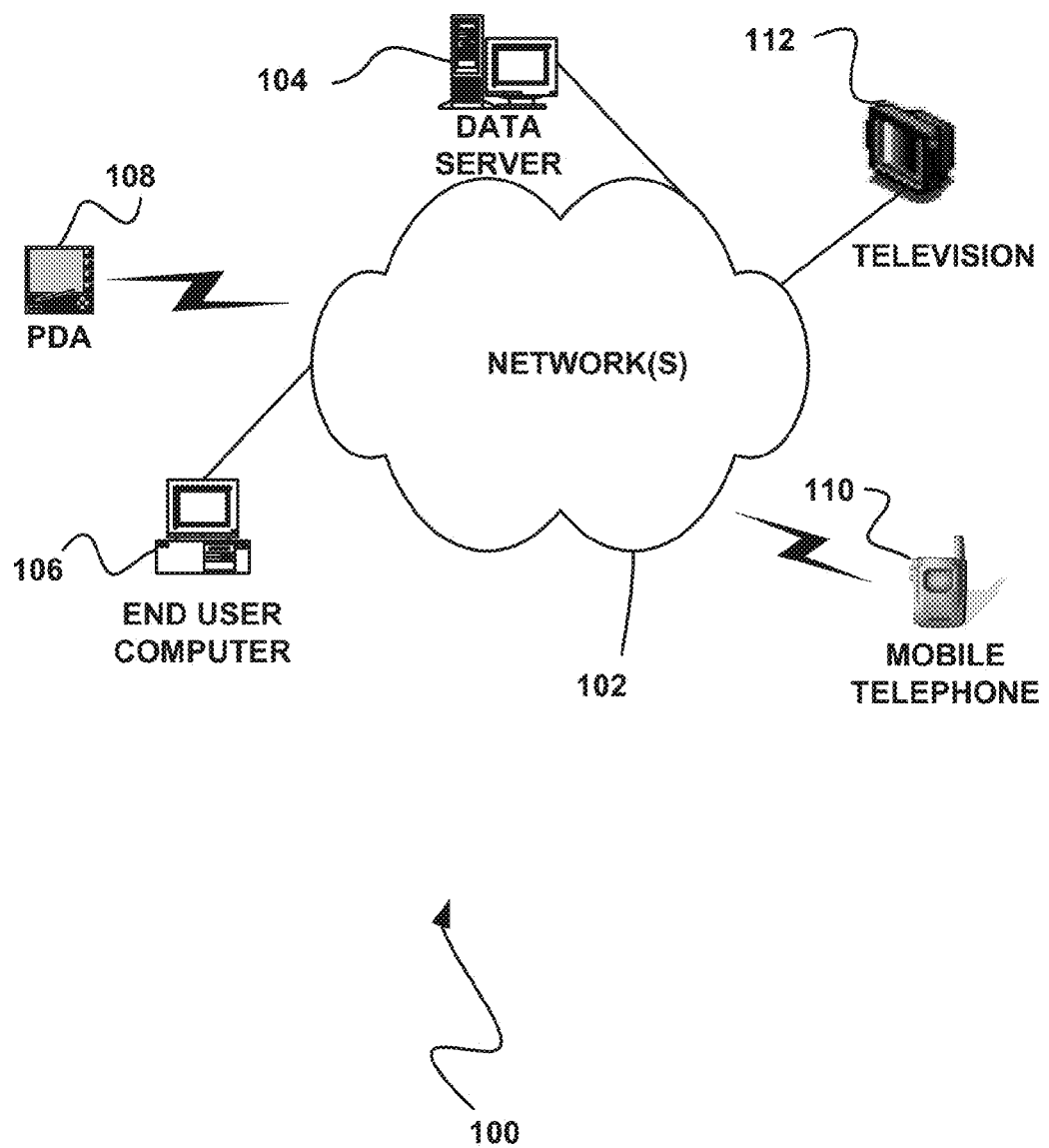
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
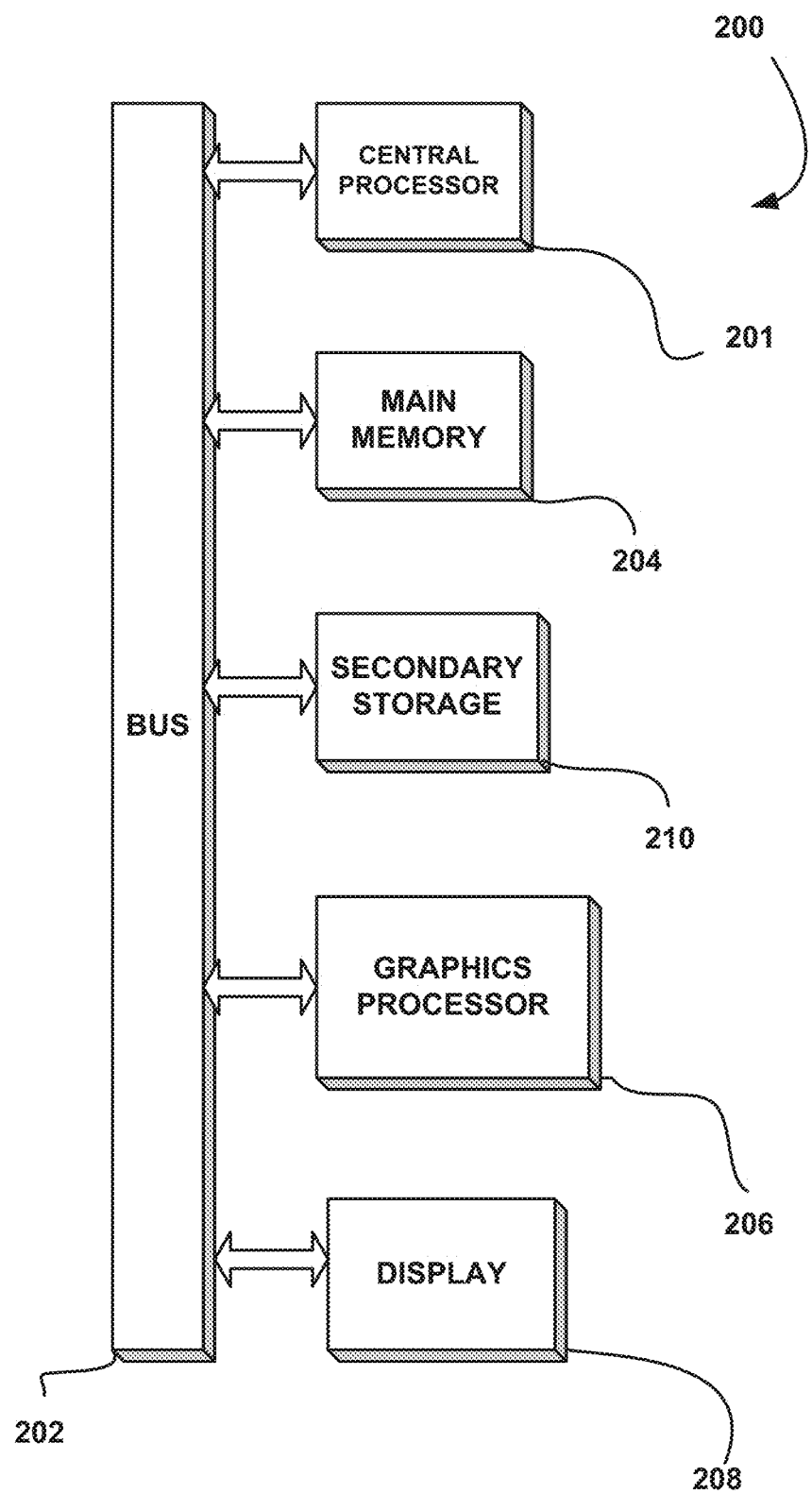
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
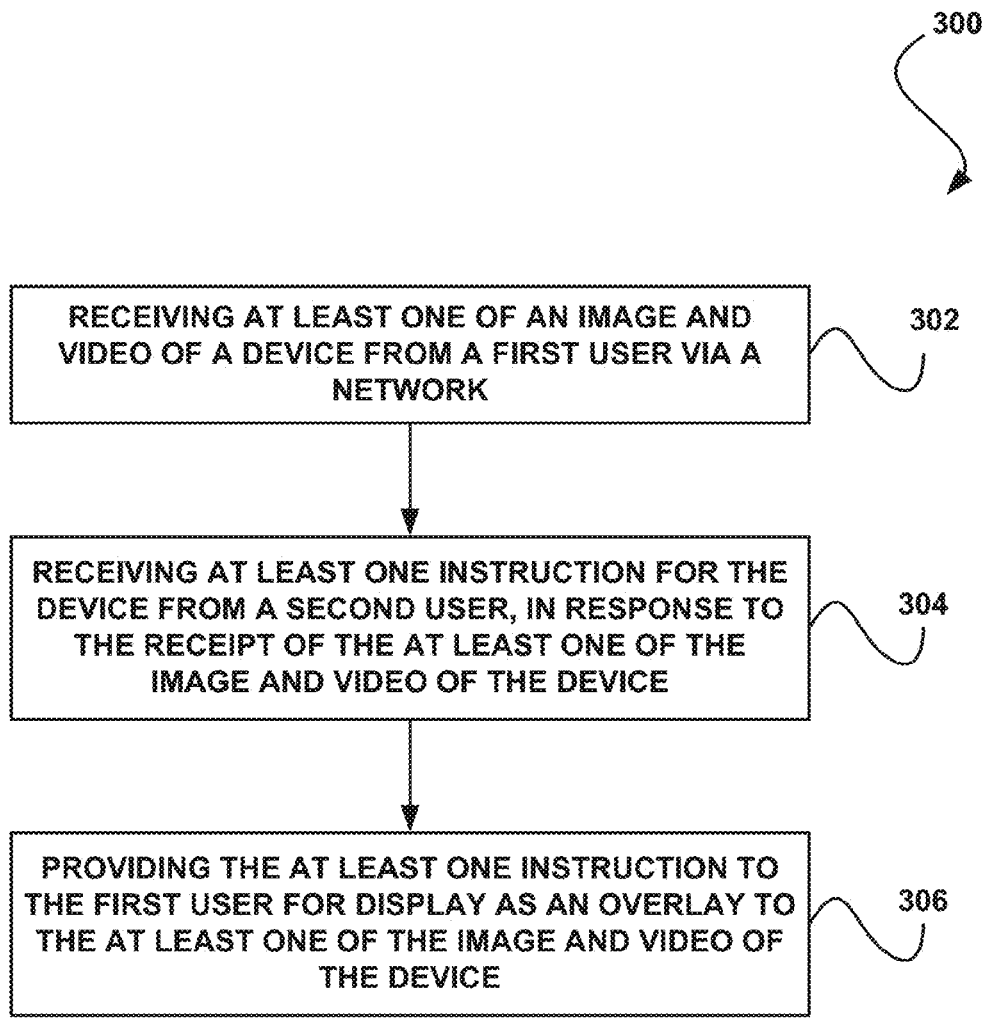
FIG. 3 illustrates a method for receiving device instructions from one user to be overlaid on an image or video of the device for another user, in accordance with one embodiment.

FIG. 3 illustrates a method 300 for receiving device instructions from one user to be overlaid on an image or video of the device for another user, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, at least one of an image and video of a device is received from a first user via a network. With respect to the present description, the device of which the image/video is received may include any device with which the first user may interact (i.e. control, manipulate, operate, configure, assemble, etc.). For example, the device may include any of the devices described above with respect to FIGS. 1 and/or 2. As other examples, the device may include a remote control, a mechanical toy, etc.

As noted above, an image and/or video of the device may be received from the first user via the network. As described in more detail below, the image/video may be received from an image capturing device coupled to the network. For example, the image/video may be received from a camera (e.g. which may be a component of a mobile phone).

Thus, in one embodiment, at least one image of the device may be received from the first user. The image may include an image captured utilizing a camera. In another embodiment, at least one video of the device may be received from the first user via the network (e.g. in real-time). Thus, as an option, the video may include real-time video received from a video camera or other camera with video capturing capabilities.

Further, the image/video may be received in response to the first user generating the image/video (i.e. using the image capturing device). As an option, the image/video may be received in response to the user selecting (e.g. on the image capturing device) to communicate the generated image/video over the network to a destination receiving the image/video. Such selection may be made via a selectable option provided by the image capturing device, for example.

Additionally, as shown in operation 304, at least one instruction for the device is received from a second user, in response to the receipt of the at least one of the image and video of the device. Such second user may include a customer service representative (CSR) (i.e. of a manufacturer of the device, a supplier of the device, etc.) which received the image/video, for example. Of course, however, the second user may include any other user separate from the first user that is capable of providing an instruction for the device in response to the receipt of the image/video of the device.

It should be noted that the instruction may include any instruction associated with the device, and in particular associated with the image/video of the device. For example, the instruction may be associated with a particular portion of the device which was only captured by the image/video. As another example, the instruction may be associated with an interaction of the first user with the device as captured by the image/video.

In one embodiment, the instruction may be for operating the device. In another embodiment, the instruction may be for configuring the device. In yet another embodiment, the instruction may be for assembling the device.

Still yet, the instruction may be received from the second user in any desired manner. As an option, the instruction may be received from the second user via a browser of another device (e.g. computer, etc.) utilized by the second user. For example, the other device of the second user may be coupled to the network for receiving the image/video of the device.

To this end, the instruction may be received from the second user in response to the second user viewing the received image/video. In this way, the instruction for the device may be associated with (e.g. tailored to, specific to, etc.) the image/video of the device, as noted above. In one embodiment, the instruction may be received from the second user in response to a selection by the second user of the instruction from a plurality of predefined instructions. Of course, in another embodiment, the instruction may be manually entered (e.g. as text, etc.) by the second user.

Furthermore, as shown in operation 306, the at least one instruction is provided to the first user for display as an overlay to the at least one of the image and video of the device. In one embodiment, the instruction may be provided to the first user by communicating the instruction from the second user to the first user over the network. For example, the instruction may be provided to the image capturing device of the first user from which the image/video was received.

In this way, the instruction may be displayed as an overlay to the image/video of the device on the image capturing device from which the image/video of the device was received. For example, the instruction may be provided for display on the image capturing device as an overlay to the real-time video of the device being captured by the device. As another option, the instruction may be displayed as an overlay to the image/video of the device on another device of the first user separate from the image capturing device by sending to such other device the instruction and the image/video.

The overlay of the instruction on the image/video of the device may include an augmented reality provided to the first user. For example, the reality of the device (and optionally the first user's interaction with the device) may be augmented by virtue of the instruction provided as an overlay to the captured image/vide of the device. However, by allowing the second user to configure the instruction for the device based on the image/video of the device received by the first user, bi-directional communications for such augmented reality may be provided.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
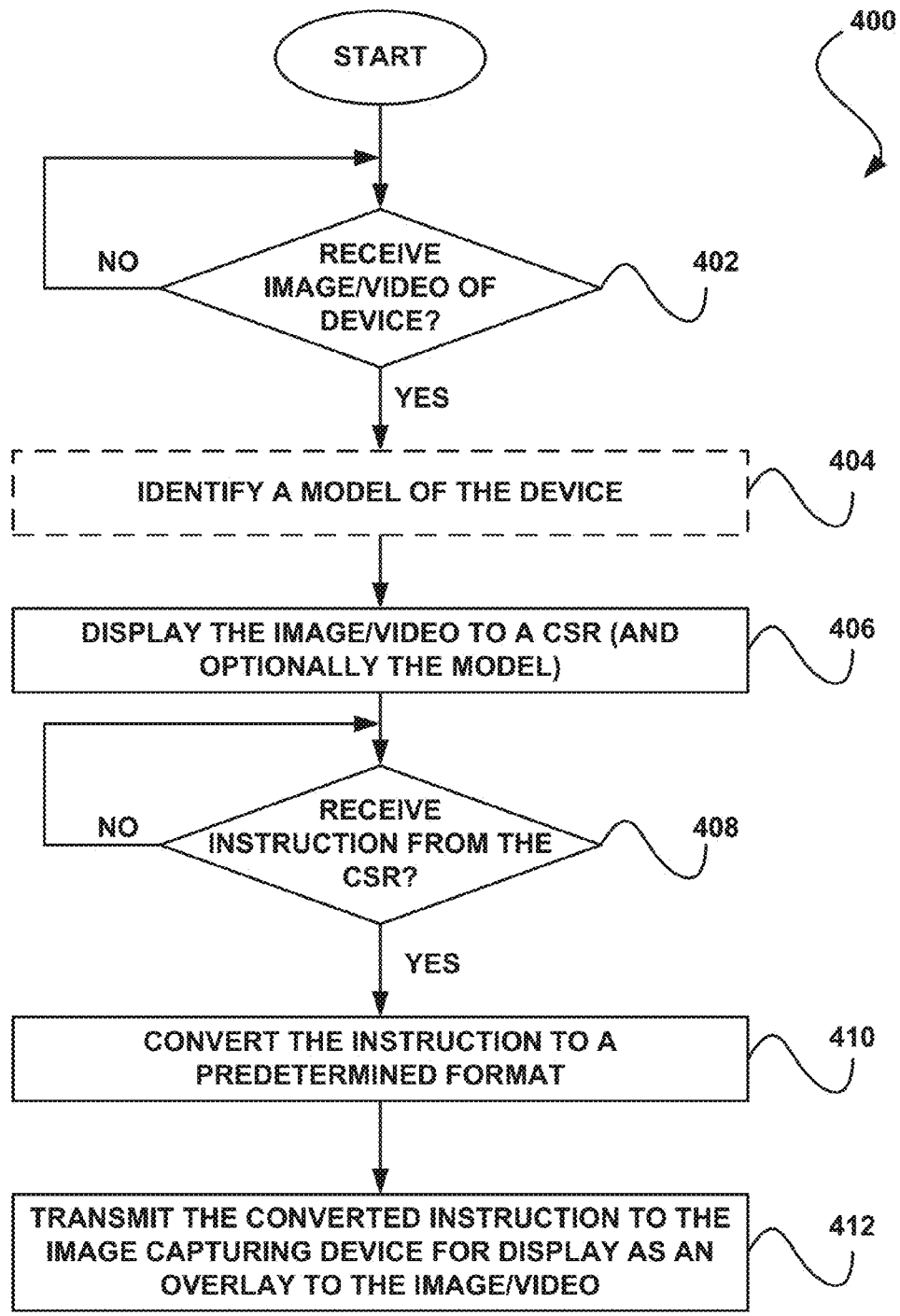
FIG. 4 illustrates a method for receiving and transmitting an instruction to device for which an image/video of the device has been received, in accordance with another embodiment.

FIG. 4 illustrates a method 400 for receiving and transmitting an instruction to device for which an image/video of the device has been received, in accordance with another embodiment. As an option, the method 400 may be carried out in the context of the details of FIGS. 1-3. Of course, however, the method 400 may be carried out in any desired environment. Again, the aforementioned definitions may equally apply to the description below.

As shown in decision 402, it is determined whether an image or video of a device has been received. In the context of the present embodiment, the decision may include determining whether the image/video of the device has been received over a network from an image capturing device of a first user. If it is determined that the image/video has not been received, the method 400 continues to wait for receipt of the image/video.

Once it is determined that the image/video has been received, a model of the device may optionally be identified. Note optional operation 404. For example, a model number of the device or any other identifier of the model of the device may be identified. As an option, the model may be identified based on input from the first user. As another option, the model may be identified from the received image/video (i.e. by reading the model number from the image/video, etc.).

Additionally, the image/video (and optionally the identified model) is displayed to a CSR, as shown in operation 406. For example, the image/video may be displayed via a web browser of a device utilized by the CSR. In one embodiment, the image/video may be displayed to the CSR is real-time.

Furthermore, it is determined whether an instruction is received from the CSR. Note decision 408. Such instruction may include any instruction that is associated with the device and that is responsive to the display of the image/video to the CSR. For example, the instruction may include an instruction for operating the device, based on an interaction with the device by the first user, as shown to the CSR via the image/video.

In one embodiment, the instruction may be received in response to the CSR selecting the instruction from a plurality of predefined instructions (e.g. which may be specific to the model of the device). For example, the CSR may enter the model of the device in an application located on a computer of the CSR, or may otherwise initiate the application to view predefined instructions from which the CSR may select. The predefined instructions may optionally be located in a repository accessible by the application.

Thus, the CSR may select from the predefined instructions, utilizing the application, in one embodiment. In another embodiment, the CSR may manually enter the instruction, such as text indicative of the instruction. In yet another embodiment, the CSR may select a portion of the image/ video (e.g. a portion of the device captured by the image/video) with which the instruction is specifically associated.

If it is determined that an instruction has not been received, the method 400 continues to wait for receipt of an instruction from the CSR. Once an instruction is received from the CSR, the instruction is converted to a predefined format. Note operation 410. As noted above, the instruction may be received as a selection of a predefined instruction, as manual input by the CSR, etc.

Thus, the instruction may be received in such first format (i.e. predefined instruction, manual input, etc.), and may be converted to a second format. The second format may include a predetermined format capable of being utilized to display the instruction to the first user. In the present embodiment, the second format may include an overlay to the image/video, as described in more detail below.

Moreover, as shown in operation 412, the converted instruction is transmitted to the image capturing device for display as an overlay to the image/video. For example, the converted instruction may be sent to the image capturing device. It this way, the image capturing device may display the converted instruction as an overlay to the image/video.

Thus, where video is continuously being received in real-time by the CSR from the image capturing device, the CSR may provide the instruction for the device to the image capturing device based on the received image/video. Further, the instruction received by the image capturing device may be displayed on the image capturing device as an overlay to the received real-time image/video. Accordingly, the instruction may optionally be provided as an overlay to a real-time image/video, such that the user may view the instruction with respect to the real-time image/video.

Figure 5A:
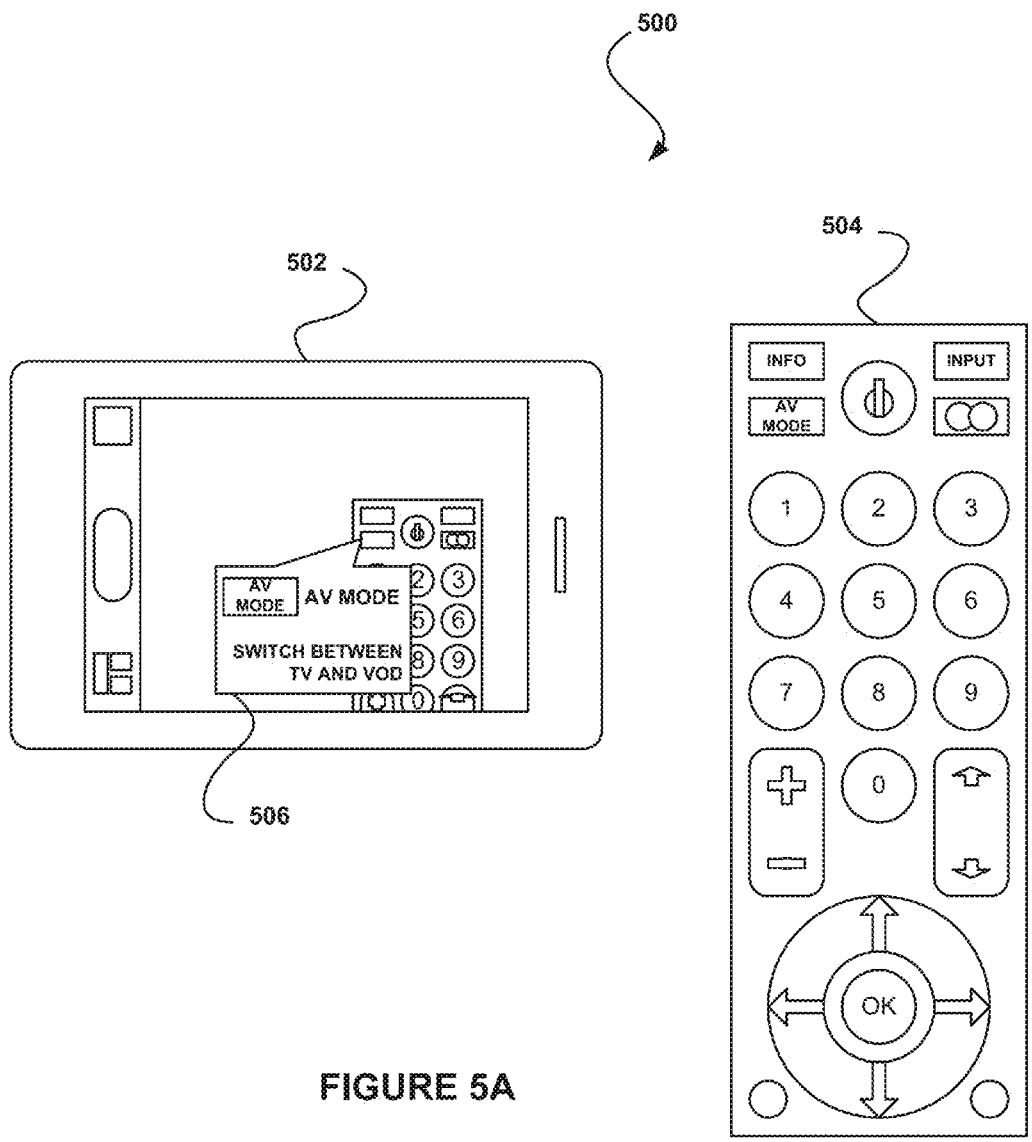
FIGS. 5A-B illustrates a system for capturing an image/video of a device and displaying an instruction for the device using the image/video, in accordance with yet another embodiment.
Figure 5B:
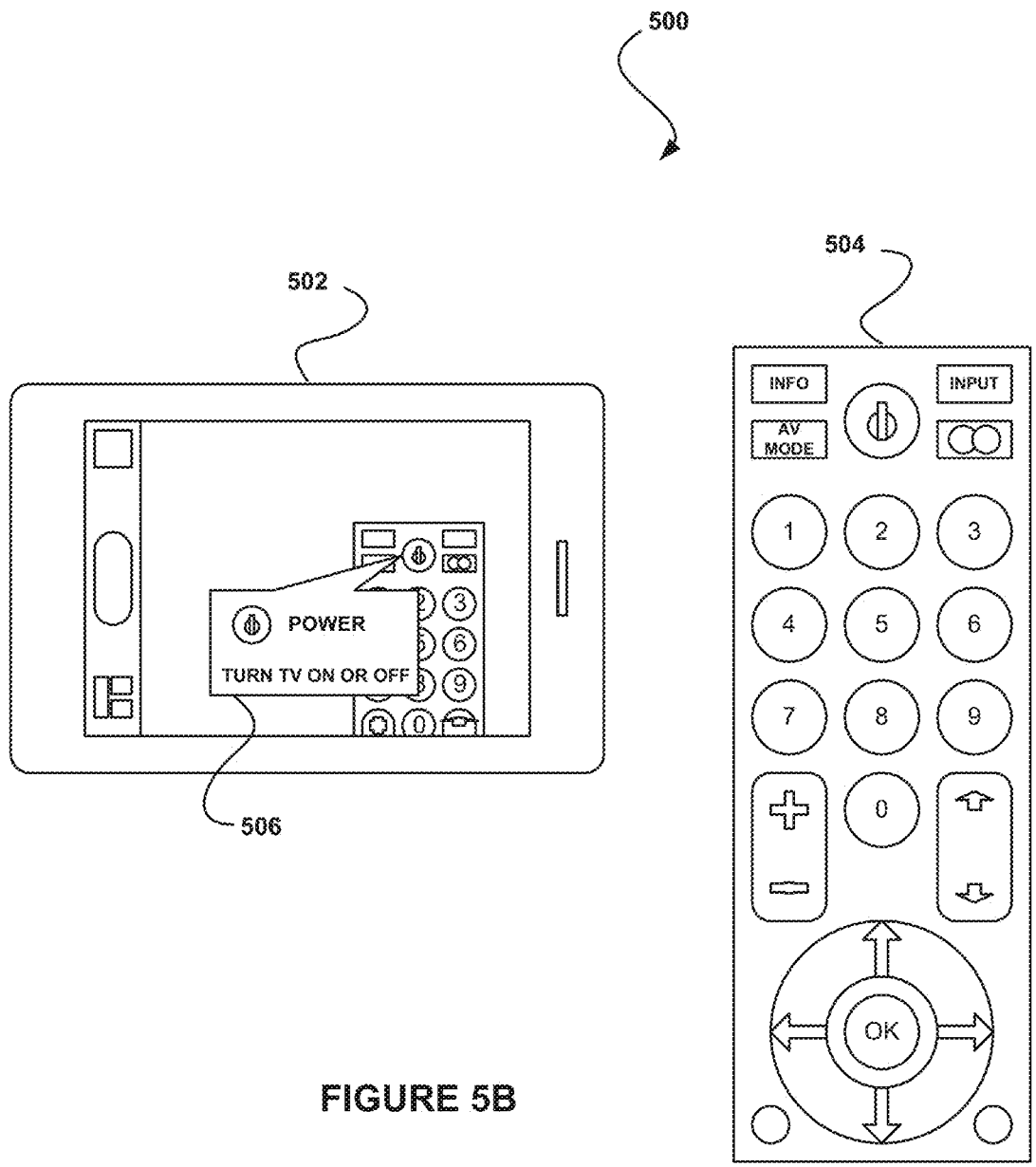

FIGS. 5A-B illustrates a system 500 for capturing an image/video of a device and displaying an instruction for the device using the image/video, in accordance with yet another embodiment. As an option, the system 500 may be implemented in the context of the details of FIGS. 1-3. Of course, however, the system 500 may be implemented in any desired environment. Yet again, the aforementioned definitions may equally apply to the description below.

As shown, an image capturing device 502 captures an image or video of a device 504. In the present embodiment, the image capturing device 502 includes a mobile phone connected to a network and having an integrated camera for capturing the image/video of the device 504. Also in the present embodiment, the device 504 includes a remote control.

The image capturing device 502 captures the image/video of the device 504, and transmits the same over a network to a browser of a device utilized by a CSR. Upon receipt of the image/video, the CSR determines an instruction associated with the captured image/video. It should be noted that the CSR may determine the instruction in any desired manner.

In one exemplary embodiment, the CSR may determine the instruction based on a portion of the device 504 captured by the image/video. In another exemplary embodiment, the CSR may determine the instruction based on an audible question associated with the device with respect to the captured image/video of the device which is posed by the user of the image capturing device 502 and communicated from the image capturing device 502 to the CSR. In yet another exemplary embodiment, the CSR may determine the instruction based on a textual question associated with the device with respect to the captured image/video of the device which is posed by the user of the image capturing device 502 and communicated from the image capturing device 502 to the CSR.

To this end, the instruction may provide information on the device 504 and/or on the user's interaction with the device 504. The determined instruction is then transmitted to the user of the image capturing device 502 and displayed as an overlay 506 to the image/video, as shown. In FIG. 5A, the overlaid instruction includes a textual instruction for the user of the image capturing device 502 to select a button on the device 504 (as pointed to by the instruction on the image/video) to switch a television controlled by the device 504 to a different mode. In FIG. 5B, the overlaid instruction includes a textual instruction for the user of the image capturing device 502 to select a button on the device 504 (as pointed to by the instruction on the image/video) to power down a television controlled by the device 504.

Figure 6:
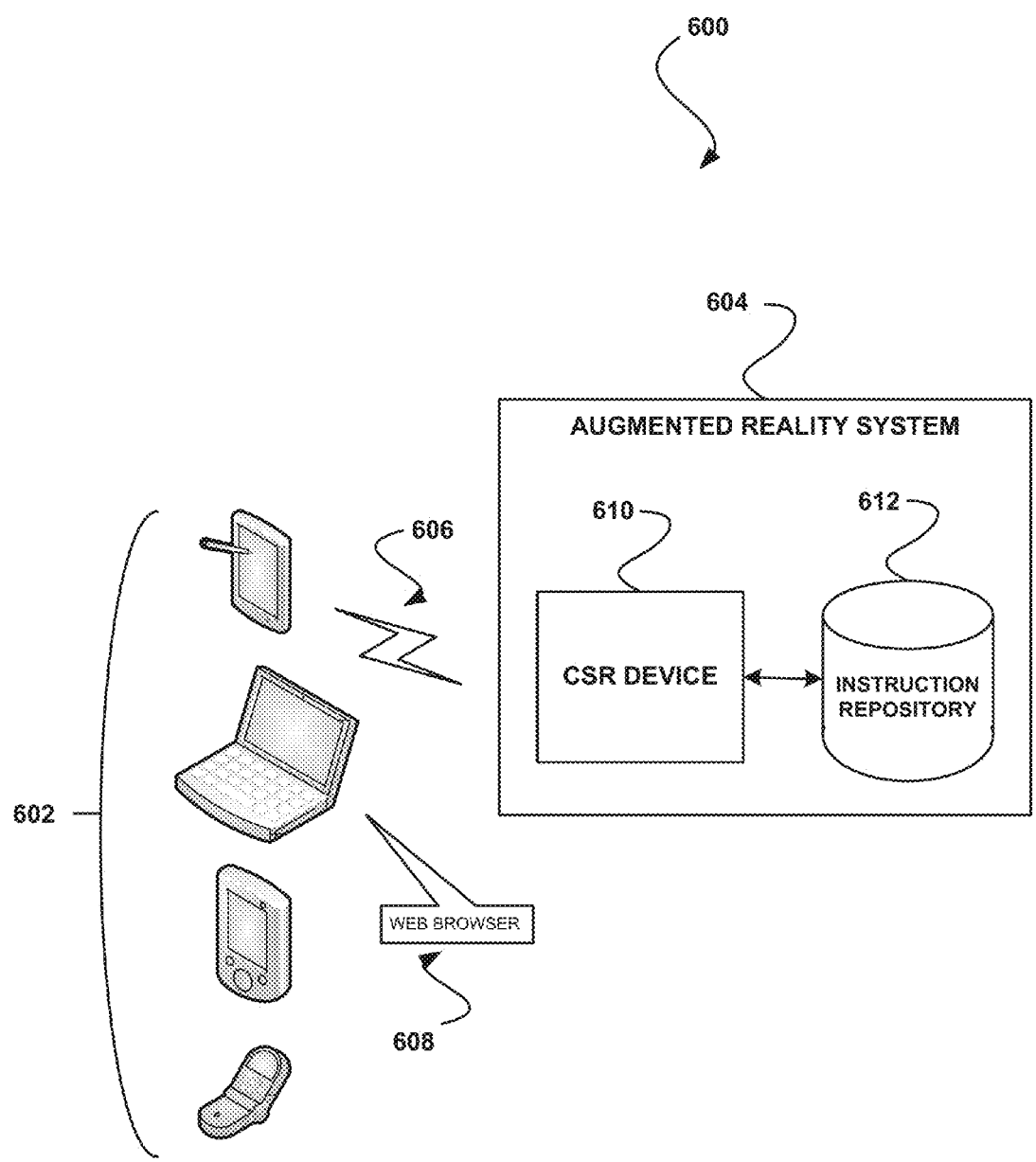
FIG. 6 illustrates a system for receiving device instructions from one user to be overlaid on an image or video of the device for another user, in accordance with yet another embodiment.

FIG. 6 illustrates a system 600 for receiving device instructions from one user to be overlaid on an image or video of the device for another user, in accordance with yet another embodiment. As an option, the system 600 may be implemented in the context of the details of FIGS. 1-3. Of course, however, the system 600 may be implemented in any desired environment. Still yet again, the aforementioned definitions may equally apply to the description below.

As shown, a plurality of image capturing devices 602 is in communication with an augmented reality system 604 via a network 606. Such image capturing devices 602 may include any device with image capturing capabilities that are connected to a network (e.g. the Internet) 606, and in the specific embodiment shown may include a PDA, laptop, digital music player, and/or mobile phone. Further, the augmented reality system 604 may include a system provided by a customer service division of a device manufacturer.

In operation, one of the devices 602 is used by a user to capture an image/video of a device for which instructions are desired by the user. The device 602 is then used to communicate the image/video to the augmented reality system 604 via the network 606. As shown, a web browser 606 of the device 602 may be used to communicate the image/video to the augmented reality system 604. A CSR connected to the augmented reality system 604 views the image/video via a CSR device 610 of the augmented reality system 604.

The CSR then uses the CSR device 610 to determine an instruction to be provided to the user based on the image/video. In one embodiment, the CSR may select the instruction from a plurality of predefined instructions stored in an instruction repository 612 of the augmented reality system 604. In another embodiment, the CSR may customize the instruction for the user by manually entering the instruction (i.e. text of the instruction, etc.). Optionally, the determined instruction may be converted to a predefined format to be used for presenting the same to the user of the device 602 from which the image/video was received.

The determined instruction is then provided by the CSR via the CSR device 610 to the user via the device 602 used by the user to capture the image/video. In particular, the instruction is provided as an overlay to the image/video. Thus, the instruction may be provided with respect to display of the image/video by the device 602 as an overlay to the image/video on the device 602.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:
- computer code for receiving at a system from an image capturing device of a first user a request for instructions for operating a second device separate from the image capturing device, where the request includes at least one of an image and video of the second device created utilizing the image capturing device;
- computer code for automatically identifying at the system, utilizing the received at least one of the image and video of the second device from the first user, an identifier of the second device including a model number of the second device;
- computer code for displaying, to a second user, the identifier of the second device, and the at least one of the image and video of the second device;
- computer code for receiving from the second user the requested instructions for operating the second device as well as a selected portion of the at least one of the image and video determined to be associated with the requested instructions, in response to the display of the at least one of the image and video of the second device to the second user, where the requested instructions are selected by the second user from a plurality of predefined instructions associated with the identifier of the second device; and
- computer code for providing the requested instructions to the first user, where the computer program is operable such that the requested instructions and the at least one of the image and video received from the first user are displayed to the first user, with the requested instructions being overlaid onto the at least one of the image and video received from the first user.

2. The computer program of claim 1, wherein the image capturing device is coupled to a network.

3. The computer program of claim 2, wherein the image capturing device is a camera.

4. The computer program of claim 3, wherein the camera is a component of a mobile phone.

5. The computer program of claim 2, wherein the image of the second device is received from the first user via the network.

6. The computer program of claim 2, wherein the video of the second device is received from the first user via the network.

7. The computer program of claim 6, wherein the video of the second device is received in real-time.

8. The computer program of claim 1, wherein the requested instructions include an instruction for configuring the second device.

9. The computer program of claim 1, wherein the requested instructions include an instruction for assembling the second device.

10. The computer program of claim 1, wherein the requested instructions are received from the second user in response to the selection by the second user of the requested instructions from the list of instructions.

11. The computer program of claim 1, wherein the requested instructions are received from the second user in response to the second user viewing the received at least one of the image and video.

12. The computer program of claim 1, wherein the requested instructions are received from the second user via a browser of a third device utilized by the second user.

13. The computer program of claim 1, wherein the requested instructions are received in a first format.

14. The computer program of claim 13, further comprising computer code for converting the instructions to a second format.

15. The computer program of claim 14, wherein the requested instructions are provided to the first user in the second format.

16. The computer program of claim 2, wherein providing the requested instructions to the first user includes transmitting the requested instructions over the network to the image capturing device from which the at least one of the image and video of the device is received from the first user.

17. The computer program of claim 1, wherein the requested instructions overlaid on the at least one of the image and video of the device include a textual instruction for the first user to select a button on the device.

18. The computer program of claim 1, wherein the requested instructions provided to the first user are based on the portion of the device selected by the second user.

19. The computer program of claim 1, wherein the requested instructions further include an assembly, such that the overlay instructs the first user on how to assemble the second device.

20. The computer program of claim 1, wherein the list of instructions is associated with the model number of the second device.

21. The computer program of claim 20, wherein the model number of the second device is identified by reading the model number from the at least one of the image and video of the second device.

22. The computer program product of claim 20, wherein the list of instructions associated with the identifier of the second device is a list of predefined instructions specific to the model number of the second device that is displayed to the second user for allowing the second user to select the requested instructions from the list of predefined instructions, and wherein the predefined instructions specific to the model of the second device are identified from a repository accessible by an application utilized by the second user to view the list of predefined instructions.

23. A method, comprising:
- receiving at a system from an image capturing device of a first user a request for instructions for operating a second device separate from the image capturing device, where the request includes at least one of an image and video of the second device created utilizing the image capturing device;
- automatically identifying at the system, utilizing the received at least one of the image and video of the second device from the first user, an identifier of the second device including a model number of the second device;
- displaying, to a second user, the identifier of the second device, and the at least one of the image and video of the second device;
- receiving from the second user the requested instructions for operating the second device as well as a selected portion of the at least one of the image and video determined to be associated with the requested instructions, in response to the display of the at least one of the image and video of the second device to the second user, where the requested instructions are selected by the second user from a plurality of predefined instructions associated with the identifier of the second device; and
- providing the requested instructions to the first user, where the computer program is operable such that the requested instructions and the at least one of the image and video received from the first user are displayed to the first user, with the requested instructions being overlaid onto the at least one of the image and video received from the first user.

24. A system, comprising:
a processor for:
- receiving at a system from an image capturing device of a first usr a request for instructions for operating a second device separate from the image capturing device, where the request includes at least one of an image and video of the second device created utilizing the image capturing device;
- automatically identifying at the system, utilizing the received at least one of the image and video of the second device from the first user, an identifier of the second device including a model number of the second device;
- displaying, to a second user, the identifier of the second device, and the at least one of the image and video of the second device;
- receiving from the second user the requested instructions for operating the second device as well as a selected portion of the at least one of the image and video determined to be associated with the requested instructions, in response to the display of the at least one of the image and video of the second device to the second user, where the requested instructions are selected by the second user from a plurality of pre-defined instructions associated with the identifier of the second device; and
- providing the requested instructions to the first user, where the computer program is operable such that the requested instructions and the at least one of the image and video received from the first user are displayed to the first user, with the requested instructions being overlaid onto the at least one of the image and video received from the first user.

25. The system of claim 24, wherein the processor is coupled to memory via a bus.

\* \* \* \* \*